United States Patent
Rose et al.

(10) Patent No.: US 10,004,360 B1
(45) Date of Patent: Jun. 26, 2018

(54) TONGS

(71) Applicant: Sorry Robots LLC, Novato, CA (US)

(72) Inventors: Samantha Rose, Novato, CA (US); John Laz, Boise, ID (US); Tasche Streib, Boise, ID (US); Brian Rose, Novato, CA (US); Christian Lester, Los Angeles, CA (US); Michael Egan, Chicago, IL (US)

(73) Assignee: Sorry Robots LLC, Novato, CA (US)

( * ) Notice: Subject to any disclaimer, the term of this patent is extended or adjusted under 35 U.S.C. 154(b) by 0 days. days.

(21) Appl. No.: 15/791,153

(22) Filed: Oct. 23, 2017

(51) Int. Cl.
*A47J 43/28* (2006.01)
*A47G 21/10* (2006.01)

(52) U.S. Cl.
CPC ............ *A47J 43/283* (2013.01); *A47G 21/10* (2013.01)

(58) Field of Classification Search
CPC ..... B25B 7/00; B25B 9/00; B25B 9/02; A47J 43/283; B65G 7/12; B25J 7/00
USPC ........................................................ 294/99.2
See application file for complete search history.

(56) References Cited

U.S. PATENT DOCUMENTS

| | | | |
|---|---|---|---|
| 2008/0179903 A1* | 7/2008 | Tardif | A47J 43/283 294/16 |
| 2009/0212583 A1* | 8/2009 | Frank | A47J 43/283 294/99.2 |
| 2009/0284031 A1* | 11/2009 | Pavicsits | A47J 43/283 294/16 |
| 2012/0126557 A1* | 5/2012 | Long | B25B 9/02 294/99.2 |
| 2013/0049386 A1* | 2/2013 | Lv | A47G 21/10 294/99.2 |

* cited by examiner

*Primary Examiner* — Stephen A Vu
(74) *Attorney, Agent, or Firm* — The Law Offices of Roger S. Thompson (57) ABSTRACT

A pair of tongs, comprises: first and second arms, each arm having a gripping end and a pivot end. A hinge pivotably joins the first and second arms at the pivot ends thereof. A spring is coupled to each of the first and second arms, the spring being biased to urge the first and second arms apart, from a first, closed position, to a second, open, position. A releasable lock locks the first and second arms in the closed position, the releasable lock being operable by a single hand of a user.

15 Claims, 5 Drawing Sheets

TONGS

BACKGROUND OF THE INVENTION

1. Field of the Invention

The invention is directed to tongs, such as those useful in the kitchen or elsewhere, for grabbing items which may be too hot or otherwise difficult to handle.

2. Description of the Related Art

Tongs are common household items, well-known and long used in many applications. Tongs generally comprise two elongated arms joined by a hinge or pivot at one end and with some sort of gripping surface at the opposed, distal, end. In most cases, the tongs, also referred to as a "pair" of tongs, also include a spring which urges the two arms into their open position, so that a user must exert a force on the arms to close them and grip an item which is to be picked up by the tongs.

Because the arms are biased apart, there is a common storage problem with the tongs, in that they take up a great deal more space when in the open position than when in the closed position. To overcome this problem, most tongs also include some sort of releasable lock to hold the tongs in the closed position, thereby making it easier to store the tongs when not in use. This gives rise to an additional problem, however, in that most known tongs require the use of both hands to open and close the lock, and thereby open and close the tongs: one hand holds the tongs in position while the other actuates the releasable lock.

In many applications, this can be inconvenient, because the user, for example a cook or chef, may need to pick up and put down the tongs repeatedly during the performance of an operation, such as preparing a dish or meal. Having to use the tongs repeatedly may entail the user putting down an object being handled, such as a pot or pan, in order to pick up and open the tongs, and then use the tongs to grasp an item. The user may then manipulate the item, such as flipping or turning a food item being prepared, and then putting the tongs down. In a crowded work space, it is advantageous if the user could then close the tongs, to minimize the footprint of the tongs on the workspace. As explained above, this traditionally requires the use of both hands: one to hold the tongs closed, and one to close the lock to keep the tongs closed. Such an operation is inconvenient and needlessly time consuming, and may distract the user from the main purpose of the process, namely cooking.

It would therefore be useful to have a pair of tongs which can be manipulated with a single hand, thereby freeing the user to concentrate on the task at hand, while minimizing the footprint required of the tongs when not actively in use.

There are known locking mechanisms for tongs that require the use of only one hand instead of two. However, these mechanisms generally require an additional manipulation that can be considered undesirable or awkward, and not related to the normal action of opening and closing the tongs. Such mechanisms include, for example, gravity-locking tongs, which require the user to orient the tongs vertically and invert or disinvert them while squeezing the tong arms to activate or disengage the locking mechanisms. Another known mechanism requires a click-action lock which is activated by pressing a protruding button at the pivot end of the tongs; this can be accomplished with one hand, but the button must be pressed against the body or other hard surface to lock or unlock the tongs.

In addition to the advantage of locking or unlocking pair of tongs with a single hand, it would be useful to have a pair of tongs that could be locked or unlocked solely by squeezing the tongs with the hand that holds the tongs, independent of orientation with respect to gravity, and without the need for pressing them against some external object, such as the user or a table.

SUMMARY OF THE INVENTION

It is an object of the invention to provide an improved pair of tongs which is capable of being manipulated between an open and closed position by the use of a single hand.

It is a further object of the invention to provide an improved pair of tongs having a releasable lock that can function independent of orientation with respect to gravity and with no other forces applied but the squeezing of the single hand that holds the tongs.

It is a further object of the invention to provide an improved pair of tongs having a releasable lock, which comprises a key and notch arrangement which engages to lock the tongs in a closed position and disengages to unlock the tongs in an open position.

It is a still further object of the invention to provide a pair of tongs which includes a releasable lock and a torsion spring, where the torsion spring has two ends which each contacts an inner surface of an arm of the pair of tongs, whereby a force applied to a portion of the arms on one side of the location where the ends of the torsion spring contact the arms locks the releasable lock and a force applied to a portion of the arms on the other side of the location where the ends of the torsion spring contact the arms unlocks the releasable lock.

Briefly stated, the invention is directed to a pair of tongs which comprises first and second arms, each arm having a gripping end and a pivot end; a hinge for pivotably joining the first and second arms at the pivot ends thereof; a spring coupled to each of the first and second aims, the spring being biased to urge the first and second arms apart, from a first, closed position, to a second, open, position; and a releasable lock for locking the first and second arms in the closed position, the releasable lock being operable by a single hand of a user independent of orientation with respect to gravity or requiring actuation of the lock by pressing against an external object.

In a preferred embodiment of the invention, the releasable lock includes at least one opening on a flange of the first arm, the opening having a notch therein, and a pin which acts as the pivot of the pair of tongs, the pin having a key at one end thereof which engages the notch in the opening when the releasable lock is locked, and is disengaged therefrom when the releasable lock is unlocked.

Other objects and features of the present invention will become apparent from the following detailed description of the presently preferred embodiments, considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
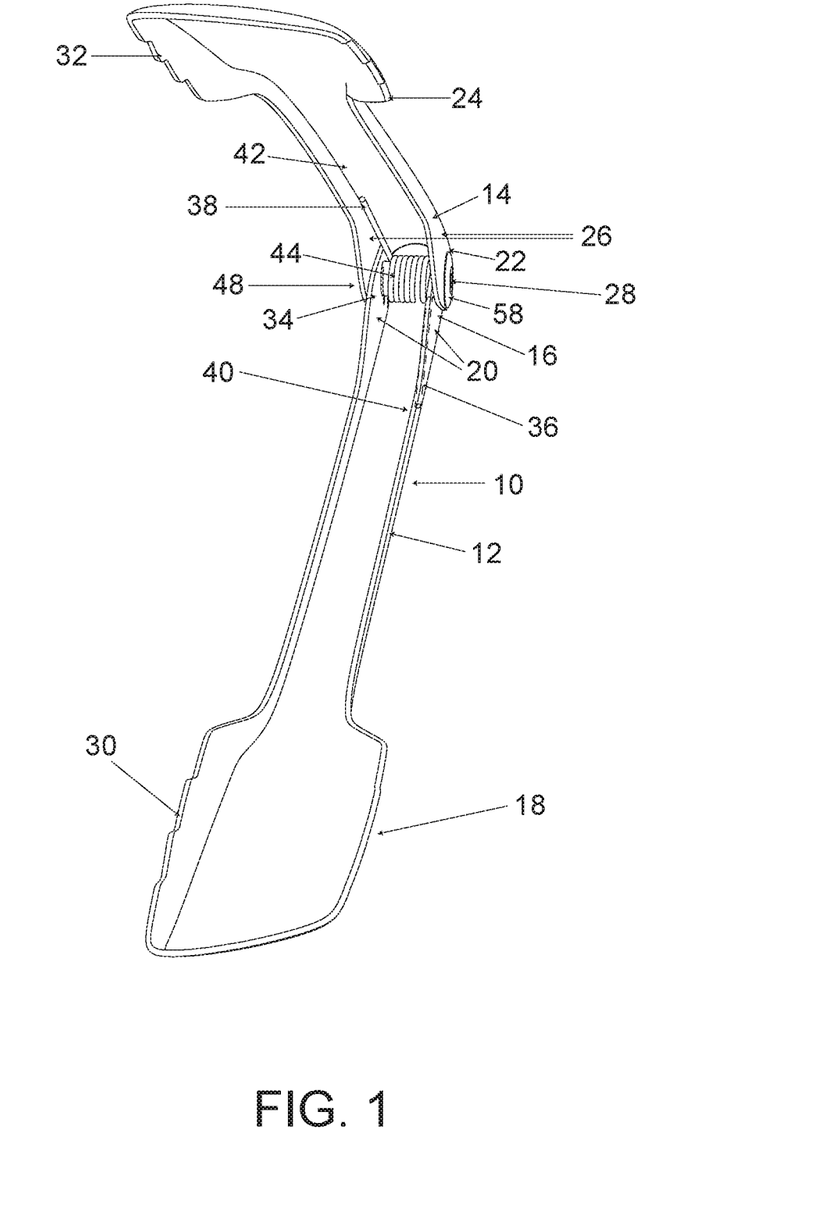
FIG. 1 shows a perspective vies of a pair of tongs in accordance with the invention in its open position.

FIG. 1 shows an inventive pair of tongs 10 in accordance with the invention. Pair of tongs 10 includes a first arm 12 and a second arm 14. First arm 12 has a pivot end 16, a gripping end 18 and a pair of opposed flanges 20 at pivot end 16 thereof. Second arm 14 has a respective pivot end 22, a respective gripping end 24, and a pair of opposed flanges 26 at pivot end 22 thereof. Pair of opposed flanges 20 of first arm 12 are nested within pair of opposed flanges 20 of second arm 14, although it will be appreciated by one of ordinary skill in the art that the designation of "first" and "second" arms is arbitrary, and so for purposes of this description, the inner arm, i.e., the arm which has flanges within the flanges of the other arm, is referred to as the "first" arm, and the "outer" arm, i.e., the arm which has flanges on the outside of the other arm is referred to as the "second" arm. Thus, second arm 14 is slightly wider than first arm 12 so that the two arms 12 and 14 may nest with first aim 12 within second arm 14.

Pivot end 16 of first arm 12 and pivot end 22 of second arm 14 are joined at a pivot 28, which will be described in more detail below.

At least one of gripping ends 18 and 24 includes some means for securing an item or substance therebetween, such as teeth 30, 32, respectively, or simply a textured surface which enhances the ability of gripping ends 18 and 24 to grip the desired item or substance.

Pair of tongs 10 further includes a spring 34 configured to bias arms 12 and 14 apart. In the illustrated preferred embodiment, spring 34 is a torsion spring having first and second free ends 36 and 38, second free end 38 is visible in FIG. 1 while first free end 36 is shown in dashed lines as obscured by flange 20 of first arm 12. First free end 36 contacts an inner side of first arm 12 at a contact location 40 distant from pivot end 16 thereof in the direction of gripping end 18. Second free end 38 contacts an inner side of second arm 14 at a contact location 42 distant from pivot end 22 thereof in the direction of gripping end 24. In the preferred embodiment illustrated in the Figures, spring 34 preferably has a central portion which comprises a helically wound portion 44 having a central opening (not visible in FIG. 1) which is generally axially aligned with pivot 28. It will be appreciated by one of ordinary skill in the art, however, that other types of springs, and specifically other types of torsion springs could be used, such as, for example, a U-Shaped torsion spring.

Pair of tongs 10 also includes a releasable lock 46 having several components, including spring 34.

Figure 2:
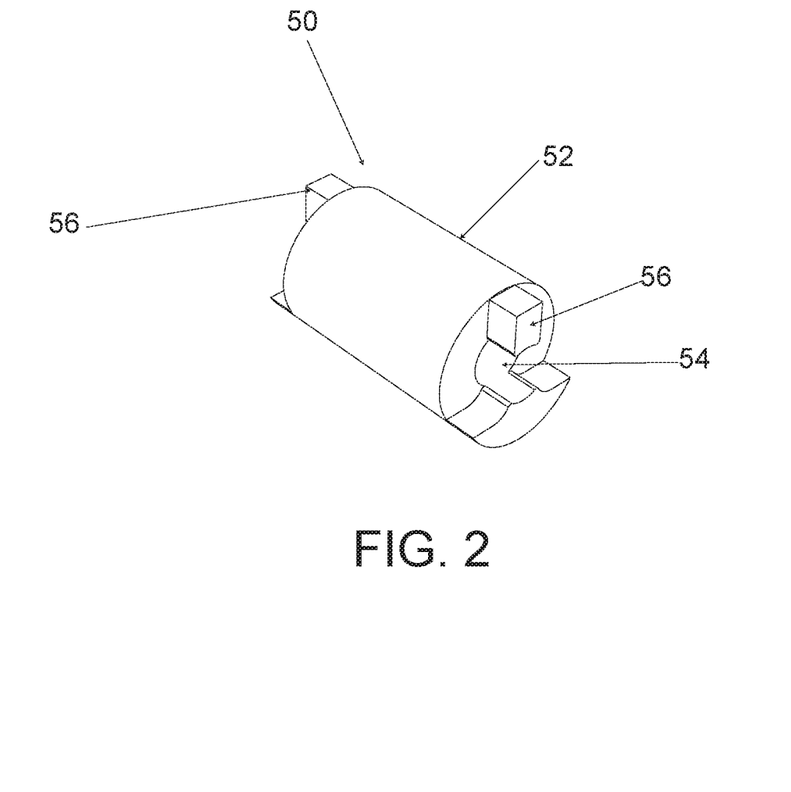
FIG. 2 shows a perspective view of a pin, one of the components of a releasable lock used in the invention.

A further component of releasable lock 46 is shown in FIG. 2., which depicts a pin 50. Pin 50 has a generally cylindrical body 52 with a hole 54 therein and a key portion 56 extending radially from hole 54. In the preferred embodiment shown in FIG. 2, pin 50 has two key portions 56, one on each end thereof. Hole 54 is generally cylindrical and co-axial with body 52.

Figure 3:
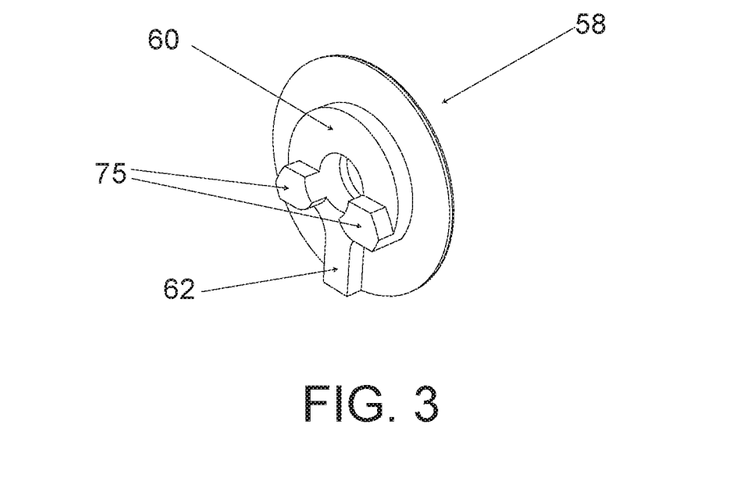
FIG. 3 shows a perspective view of an end cap, a further, optional, component of the releasable lock used in the invention.

A still further component of releasable lock 46 is shown in FIG. 3, which depicts an end cap 58 used to seal releasable lock 46. The perspective view of FIG. 3 shows the inner side of end cap 58, the outer side of which is shown in FIG. 1. As shown in FIG. 3, the inner side of end cap 58 includes an annular receiving aperture 60 and a key portion 62 extending radially therefrom.

End cap 58 is optional, as it is possible to seal releasable lock 46 in other ways, but the use of two opposed, substantially identical, end caps 58 (only one of which is shown in FIGS. 1 and 2) is preferred.

Figure 4:
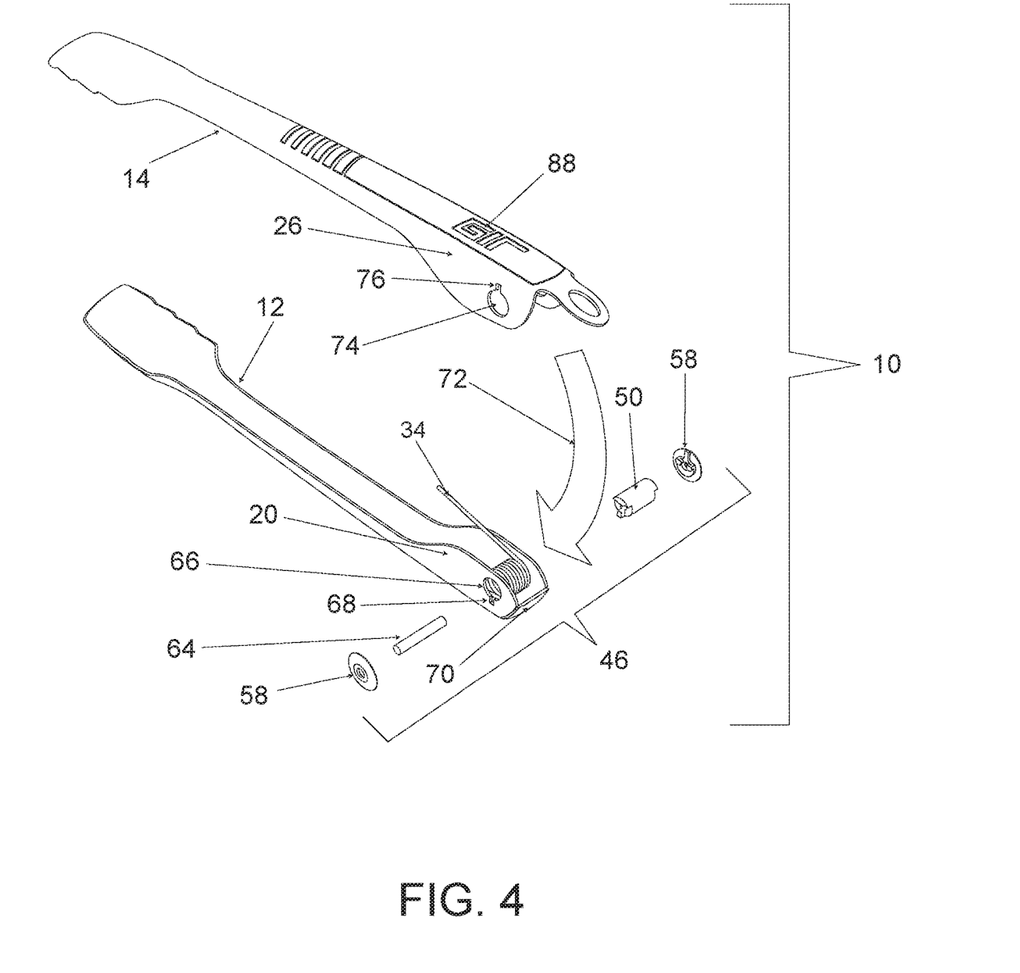
FIG. 4 shows an exploded perspective of the inventive pair of tongs, so that a better view of the releasable lack may be provided.

A more complete view of releasable lock 46 may be seen in FIG. 4. As shown, in addition to the recited components of releasable lock 46, releasable lock 46 further includes a bar 64. Bar 64 is generally cylindrical, and is sized to fit within opening 54 in pin 50. Additionally, as part of releasable lock 46, flange 16 has a pair of openings 66 (only one of which is visible in FIG. 4) sized to permit the passage of pin 50 therethrough. Openings 66 include respective notches 68 therein. Only one notch 68 is visible in FIG. 4. Notches 68 are sized to receive key portions 56 therein in a releasable friction fit, and are located at the periphery of opening 66 on the part of opening 66 which is furthest from second arm 14. As illustrated in FIG. 4, this is on the lowermost portion of opening 66. Alternatively, other mechanical means could be used to maintain key portion 56 in notch 68, such as, for example, a snap fit arrangement, or other suitable mechanical attachment mechanism.

The operation of releasable lock and the interaction of its components will be described presently. First, the assembly of pair of tongs 10 is discussed with reference to FIG. 4.

To assemble pair of tongs 10, spring 34 is disposed within first arm 12 so that the central opening of helically wound portion 44 of spring 34 is aligned with openings 66 in flanges 20. To assist in retaining spring 34 in place, and close off the operative pieces of pair of tongs 10, pivot end 16 of first arm 12 includes a rear wall 70. After spring 34 is in position, second arm 14 is then slid into place as shown by arrow 72. This captures spring 34 in place.

Bar 64 is then inserted through an opening 74 in flange 26 of second (outer) arm 14, and then through the respective opening 66 in flange 20 of first (inner) arm 12, and continuing through the central opening of helically wound portion 44 of spring 34 until it reached the other flange 20 of first arm 13 and then through the other opening 66 in flange 26 of second arm 14. This assembly retains spring 46 in place, and also retains first and second arms 12, 14 in place. In the preferred method of assembly, pair of tongs 10 are closed and retained in place, for example, by a band (not shown) or other known means, such as a wire tie for the remainder of the assembly process.

Next, pin 50 is inserted through one opening 66 in one flange 20 replacing bar 64 within the central opening in spring 34. Pin 50 is then aligned so that key portions 56 thereof are aligned with respective notches 68 in flange 20 of first arm 12, i.e., completely within the assembled pair of tongs 10.

In the preferred embodiment, one end of bar 64 is then blunted, for example by a hammer or other blunt object, so that the blunted end will be unable to pass through end cap 58, and unable to pass through the partially assembled releasable lock 34. In a preferred method of assembly, annular receiving aperture 60 extends completely through end cap 58, and accommodates bar 64 therethrough. The end of bar 64 which is blunted is disposed on the exterior of end cap 58 to restrain the movement of bar 64 through the partially assembled releasable lock 34. Bar 64 is sufficiently long to reach completely through both openings 74 in flanges 26 of second arm 14, but not so long that it extends far beyond the exterior sides of end caps 58 so that the other end thereof may be passed through the other end cap 58 and be blunted, as well, thereby securing releasable lock 34 in place.

In either embodiment, bar 64 is passed through the assembly and through opening 54 in pin 50. The combination of these elements acts as a hinge for releasable lock 34, and the central opening of pin 50 serves as a knuckle of said hinge. Bar 64, however, should not rotate with respect to second arm 14. This may be accomplished by the use of projections 75 on end cap 58 (shown best in FIG. 3). Projections 75 are sized and positioned to engage bar 64 when assembled, so that bar 64 and end cap 58 are secured together and will not rotate with respect to one another (or with respect to second arm 14), just as pin 54 is secured against rotation with respect to first arm 12. Bar 64 is free to rotate with respect to pin 54, however, thereby allowing pair of tongs 10 to open and close.

Furthermore, key portions 62 of end caps 58 engage notches 76 in openings 74 to prevent rotational movement of end caps 58 and assist in securing end caps 58 in place, thereby completing the assembly of pair of tongs 10.

If a band or other fastener was employed to hold pair of tongs 10 closed during assembly, it may now be safely removed.

In an alternative embodiment, bar 64 does not pass completely through end caps 58, but abuts an interior side thereof, and is secured in place, for example by a tight friction fit with annular receiving aperture 60 (which in this embodiment would not extend completely through end cap 58) and projections 75, or by use of an adhesive or other suitable fastening means. One of ordinary skill in the art would be able to choose an appropriate method of fastening bar 64 in place depending upon manufacturing or other constraints in a particular application.

In a further alternate embodiment, it is possible that pin 50 could be made integrally with one end cap 58, so that the assembly of pin 50 and this one end cap 58 could be allowed to rotate together. This would mean that this one end cap would be moving on the exterior of pair of tongs 10, so it is not preferred, but may be useful in some applications.

Figure 5:
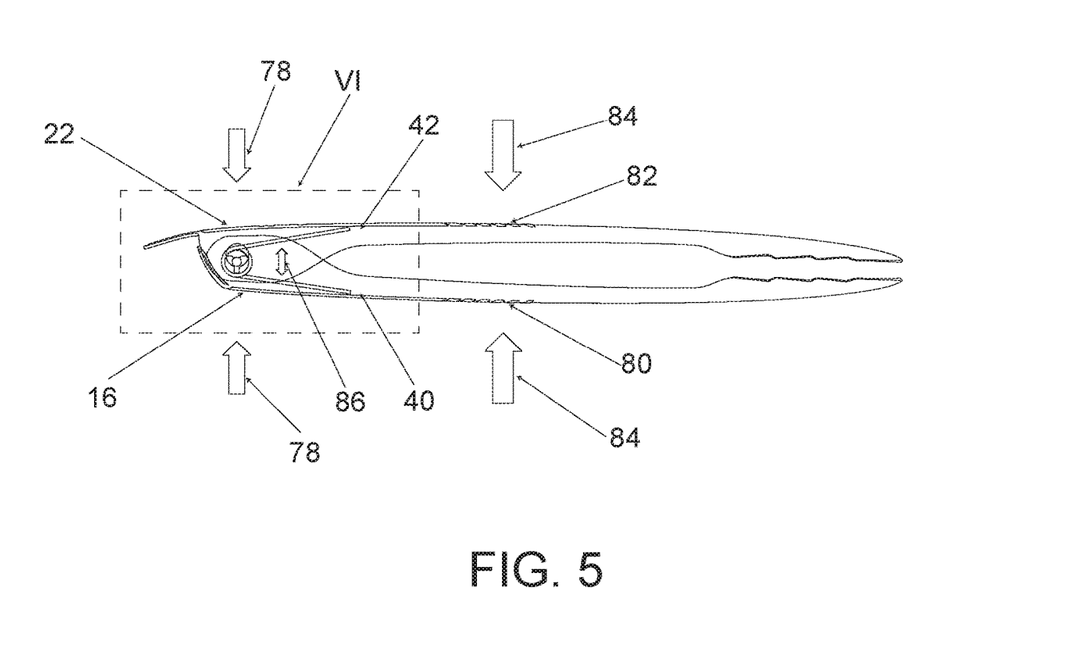
FIG. 5 shows a side cross-section of the inventive pair of tongs in the closed position.
Figure 6:
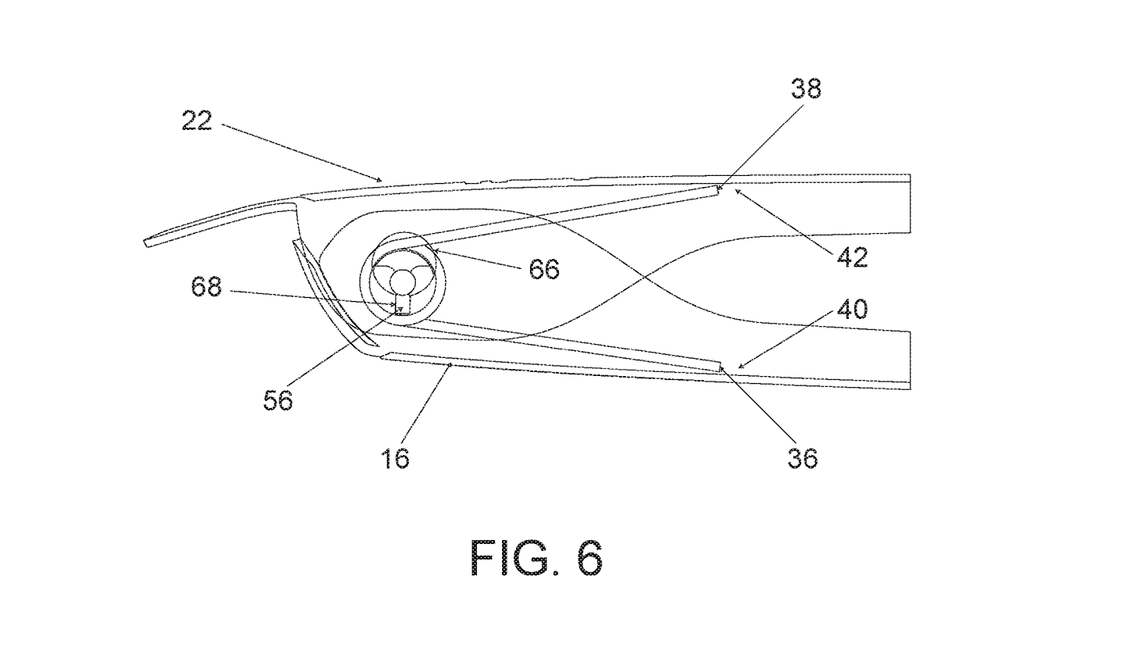
FIG. 6 shows a detail of a portion of FIG. 5 illustrated by the dashed box VI therein.

This assembly allows for the use of only a single hand to open and close pair of tongs 10, without reliance on gravity assistance or requiring the pressing of pair of tongs 10 against any external object, such as the user or a table, as will be explained with reference to FIGS. 5 and 6.

To close pair of tongs 10, a force, such as pressure, is applied to the exterior of pair of tongs 10 at pivot ends 16 and 22 of first and second arms 12, 14, respectively, as shown by the inward facing arrows 78. These regions of arms 12, 14 may be referred to as "locking regions". The applied force causes key portions 56 of pin 50 to engage respective notches 68 in openings 66. If key portions 56 are not aligned with notches 68, then they do not engage, and pair of tongs 10 remains open. Thus, pair of tongs 10 may only be locked in the position in which key portions 56 and notches 68 align, i.e., the closed position.

To open pair of tongs 10, a force, such as pressure, is applied to unlocking regions 80, 82 on first and second arms 12, 14, respectively. Unlocking regions 80, 82 are located on their respective arms closer to the gripping ends 18, 24 thereof, respectively, than contact locations 40, 42, respectively. This positioning allows contact locations 40, 42 of free ends 36, 38, respectively, to act as fulcrums for first and second arms 12, 14, respectively. Thus, when inward pressure is applied to unlocking regions 80, 82 as shown by inward facing arrows 84, the placement of the fulcrums translates that inward motion to an outward motion illustrated by double-headed arrow 86 at the opposing end of first and second arms 12, 14. This outward motion causes key portions 56 to disengage from notches 68, unlocking pair of tongs 10 and allowing the natural bias of spring 34 to urge pair of tongs 10 into an open position, from which it may be manipulated by a user to grip items as desired. Then, when the user is done with pair of tongs 10, pressure on pivot ends 16, 22 locks pair of tongs 10, as previously described.

Thus, it will be appreciated by one of ordinary skill in the art that the two regions which allow for locking and unlocking of pair of tongs 10 may be activated by a single hand of a user. Furthermore, if that hand is placed properly, the locking and unlocking may be performed without the user moving his or her hand along the length of the tongs to open the pair of tongs, use the pair of tongs and lock the pair of tongs.

To assist in the gripping of pair of tongs 10, and the proper positioning of the hand to accomplish the one-hand usage, the locking regions of first and second arms 12, 14 and the unlocking regions thereof may be provided with textured gripping surfaces, which both allows better grip at these regions and serves to identify the proper regions for placement of a user's hands. In the Figures, FIGS. 5 and 6 show unlocking regions 80, 82 as having textured surfaces, and FIG. 4 shows embossed lettering applied to locking region 88 on second arm 14.

In a preferred embodiment, pair of tongs 10 can be substantially completely made of stainless steel, or other suitably hard metal, although textured gripping surfaces may be made of any suitable material, such as silicone rubber. Alternatively, it is possible to make arms 12 and 14 out of a plastic material, while making the remainder, particularly spring 34, out of metal, such as stainless steel. In any event, selection of the materials of the various elements of pair of tongs 10 is well within the skill of one of ordinary skill in the art, to accommodate the needs of any specific application in which it may be used.

In a further alternate embodiment, pin 50, one end cap 58 and bar 64 are integrally formed. In this embodiment, pin 50 does not engage the inner pair of flanges 20 of first arm 12, but rather only notch 76 in opening 74 in second arm 14, meaning it is possible to manufacture opening 66 in first arm 12 without a notch 68 therein. The operation of pair of tongs 10 is unaffected by this change.

Figure 7:
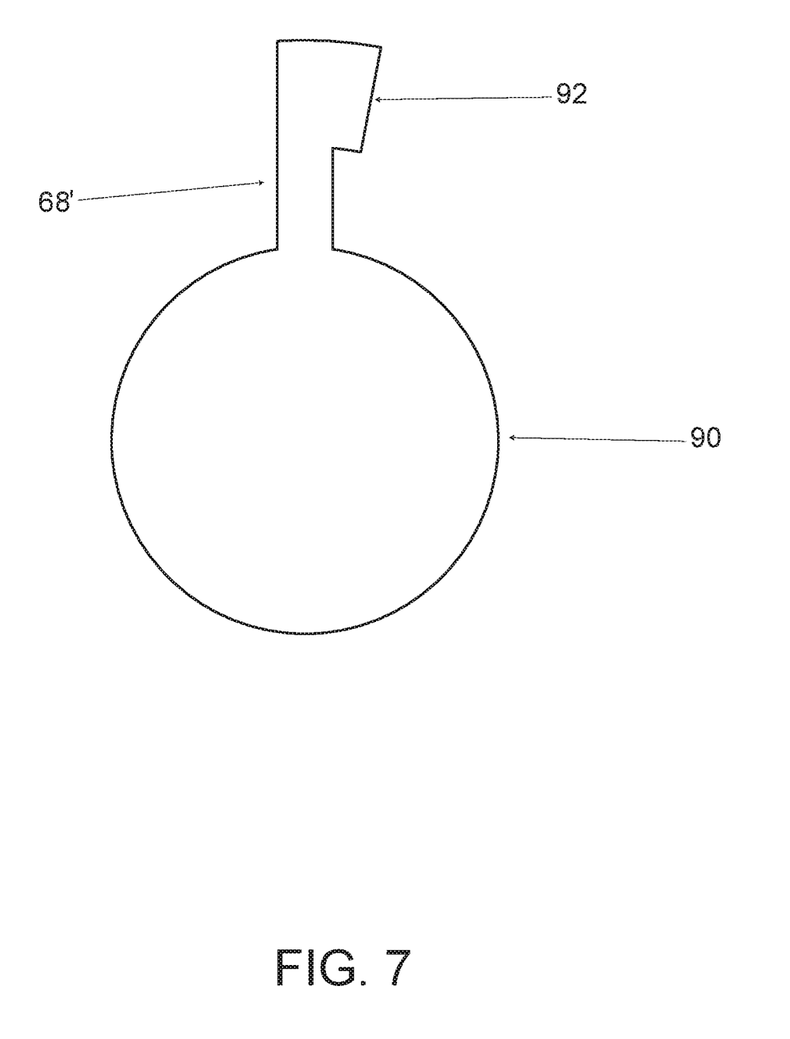
FIG. 7 shows a cross-section of an optional second releasable lock for use with the inventive pair of tongs, to provide additional security against inadvertent or undesired opening thereof.

As illustrated in FIG. 7, in a still further alternate embodiment of the invention, a second releasable lock 90 may be provided. Preferably, second releasable lock 90 utilizes most of the same components of releasable lock 46, for ease of construction. However, in this embodiment, notch 68 or 76 thereof (illustrated here as notch 68') includes a further keyway 92 positioned at the end of notch 68', sized to receive key portion 56. In use, when the user wishes to lock pair of tongs 10 in a closed position, an external force exerted on the locking region(s) of the pair of tongs (as shown by arrows 78 in FIG. 5) will urge key portion 56 into notch 68', and then into keyway 92 by a sliding movement so that the side of key portion 56 engages the side of keyway 92, preventing the release of releasable lock 46 and the opening of pair of tongs 10. To open pair of tongs 10, the user simply slides one of arms 12, 14 so that key portion 56 disengages from keyway 92, thereby releasing pair of tongs 10.

It will be appreciated by one of ordinary skill in the art that the sliding movement of arms 12, 14 could be in either direction, depending upon the orientation of keyway 92, depending upon the particular nature of the application. Furthermore, second releasable lock 90 could be used either together with releasable lock 46 to provide additional security, or in lieu of releasable lock 46, thereby obviating the need to manufacture key portions 56 and notches 68 and/or 76 so as to accommodate the above-mentioned friction fit. One of ordinary skill in the art can easily select the best arrangement of releasable locks as may be best for a particular application.

In the preceding Detailed Description, reference was made to the accompanying drawings, which form a part of this disclosure, and in which are shown illustrative specific embodiments of the invention. In this regard, directional terminology, such as "top", "bottom", "up", "down", "left", "right", "front", "back", etc., is used with reference to the orientation of the Figure(s) with which such terms are used. Because components of embodiments can be positioned in a number of different orientations, the directional terminology is used for purposes of ease of understanding and illustration only and is not to be considered limiting.

Additionally, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pair of tongs, comprising:
   first and second arms, each arm having a gripping end and a pivot end;
   a hinge for pivotably joining said first and second arms at said pivot ends thereof;
   a torsion spring coupled to each of said first and second arms, said spring being biased to urge said first and second arms apart, from a first closed position to a second open position, said torsion spring also having a first end and a second end; and
   a releasable lock for locking said first and second arms in said closed position, said releasable lock being operable by a single hand of a user;
   wherein said releasable lock includes a notch located on one of said first arm and said second arm, and
   wherein said hinge includes a pin having a key sized to engage said notch, said key being positioned on an end of said pin;
   whereby, when said releasable lock is in said closed position, said key is positioned to engage said notch, and when said releasable lock is in said open position, said key is positioned so as to not engage said lock;
   wherein said first end of said torsion spring is positioned to contact an inner side of said first arm at a first location removed from said pivot end of said first arm in a direction towards said gripping end thereof;
   wherein said second end of said torsion spring is positioned to contact an inner side of said second arm at a second location removed from said pivot end of said second arm in a direction towards said gripping end thereof;
   wherein said first arm includes a first locking region near said hinge in which pressure applied to at least one of said first arm and said second arm locks said releasable lock by moving said key of said pin into engagement with said notch, said locking region being located closer to said hinge than said first location at which said first end of said torsion spring contacts said inner side of said first arm; and
   wherein said first arm includes a second unlocking region closer to said gripping end thereof than said first region thereof, in which pressure applied to said first arm unlocks said releasable lock by disengaging said key from said notch;
   whereby said first end of said torsion spring acts as a fulcrum of said first arm, to permit the engagement and disengagement of said key with said notch.

2. The pair of tongs of claim 1,
   wherein each of said first and second arms includes a pair of flanges positioned near said pivot ends thereof, and configured to extend toward the other of said first and second arms when the pair of tongs is assembled; and
   wherein one of said pair of flanges of one of said first and second arms is configured to nest within the other of said pair of flanges when assembled, so that said one of said pair of flanges is an inner pair of flanges and the other of said pair of flanges is an outer pair of flanges.

3. The pair of tongs of claim 2, wherein said notch is located on said inner pair of flanges.

4. The pair of tongs of claim 2, wherein one of said pair of flanges includes an opening therein, and said notch is positioned on the periphery of said opening.

5. The pair of tongs of claim 4, wherein each of said one of said pair of flanges includes an opening having a notch in the periphery thereof; and said pin includes a key on each end thereof, each key being configured to engage a respective one of said notches in said one of said pair of flanges when the pair of tongs is in said closed position.

6. The pair of tongs of claim 4, wherein said torsion spring, has opposed first and second ends, said torsion spring being configured to bias said first and second arms away from one another.

7. The pair of tongs of claim 6,
   wherein said torsion spring includes a helically wound portion between said first and second ends thereof, said helically wound portion having a central opening about which said torsion spring is wound;
   wherein said central opening of said torsion spring serves as the knuckle of the hinge; and wherein said pin is located within said central opening of said torsion spring.

8. The pair of tongs of claim 4, wherein said opening extends completely through said one of said pair of flanges.

9. The pair of tongs of claim 1, wherein said pin is generally cylindrical in cross-section.

10. The pair of tongs of claim 1, wherein said pin is the pivot of said hinge.

11. The pair of tongs of claim 1, wherein said key is sized to provide a friction fit with said notch, the friction afforded by said friction fit being of sufficient strength to overcome the bias of said spring to urge said first and second arms apart without the application of an additional force, and thereby retain said key in said notch until said additional force is applied.

12. The pair of tongs of claim 1, wherein said key and said notch are joined by a releasable mechanical attachment mechanism.

13. The pair of tongs of claim 1, further comprising a second releasable lock for providing further security to retain said pair of tongs in said closed position when said second releasable lock is engaged.

14. The pair of tongs of claim 13, wherein said second releasable lock is engaged by relative sliding movement of said first and second arms in a first direction to lock said second releasable lock and is disengaged by relative sliding movement of said first and second arms in a second direction to unlock said second releasable lock.

15. The pair of tongs of claim 14 wherein said first and second directions lie substantially along the length of said first and second arms and are substantially opposite to one another.

\* \* \* \* \*